United States Patent
Patti et al.

(10) Patent No.: US 6,556,366 B2
(45) Date of Patent: Apr. 29, 2003

(54) BIMODAL BIASING OF MAGNETO RESISTIVE HEADS

(75) Inventors: Giuseppe Patti, San Jose, CA (US); Axel Alegre de La Soujeole, Scotts Valley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/944,265

(22) Filed: Aug. 30, 2001

(65) Prior Publication Data

US 2002/0030916 A1 Mar. 14, 2002

Related U.S. Application Data

(62) Division of application No. 09/187,561, filed on Nov. 4, 1998, now Pat. No. 6,307,699.

(51) Int. Cl.[7] .............................. G11B 5/03; G11B 5/02; G11B 5/09; G11B 27/36
(52) U.S. Cl. .......................... 360/66; 360/31; 360/53; 360/25
(58) Field of Search .............................. 360/66, 25, 31, 360/53

(56) References Cited

U.S. PATENT DOCUMENTS

| | | | | |
|---|---|---|---|---|
| 4,379,311 A | * | 4/1983 | Ohkawara | 360/66 |
| 5,032,935 A | | 7/1991 | Jove et al. | 360/67 |
| 6,101,056 A | | 8/2000 | Klaassen et al. | 360/66 |
| 6,111,717 A | | 8/2000 | Cloke et al. | 360/67 |
| 6,195,215 B1 | * | 2/2001 | Yanagimoto et al. | 360/25 |
| 6,304,594 B1 | * | 10/2001 | Salinger | 375/219 |

OTHER PUBLICATIONS

VTC, Inc., "VM5400 Series/Programmable, Dual Supply, Giant Magneto–Resistive Head Read/Write Preamplifier," Oct. 9, 1998, p.1–1 to 1–22.

* cited by examiner

*Primary Examiner*—Regina N. Holder
(74) *Attorney, Agent, or Firm*—David V. Carlson; Lisa K. Jorgenson (57) ABSTRACT

A system and method for selecting between two biasing modes for biasing magneto resistive heads in a disk drive. A mode selector selects either a voltage biasing circuit or a current biasing to supply the bias voltage or bias current, respectively, to a magneto resistive head. The selection can be based on changes in parameters in the disk drive or magneto resistive heads during disk drive operation.

7 Claims, 6 Drawing Sheets

Fig. 5

BIMODAL BIASING OF MAGNETO RESISTIVE HEADS

CROSS-REFERENCE TO RELATED APPLICATION

This application is a Divisional of U.S. patent application Ser. No. 09/187,561, filed Nov. 4, 1998 now U.S. Pat. No. 6,307,699.

TECHNICAL FIELD

The invention is related generally to storage devices and, in particular, to biasing of magneto resistive heads for memory devices.

BACKGROUND OF THE INVENTION

Magneto resistive heads (or MR heads) are used in data storage devices, such as disk drives, tape drives, removable and flexible media drives, etc., where data is stored on the data storage media (or disks) in the form of small, permanently magnetized regions. The magnetized regions produce magnetic fields due to divergence in the magnetization. As the MR head passes over the disk and reads the data stored thereon, the magnetic field from the permanently magnetized regions modulates the resistance of the MR head. A biasing signal, either current or voltage, typically is supplied to bias the magnetization of the MR head to a quiescent condition of optimum sensitivity and minimum distortion. If a biasing current is used, it is applied through the MR head. If a biasing voltage is used, it is applied across the MR head. A variation in the current or voltage can be sensed to read data values as the head passes over the disk.

Each mode has different advantages and limitations. For example, current biasing has fewer noise problems and is usually adequately sensitive for performing read operations. However, current biasing, particularly with high current amplitude values, can cause premature aging of the MR head. Voltage biasing can be straight forward from a circuit standpoint, and is subject to noise issues and does not provide the sensitivity level desired in some applications.

Today, the electronic biasing circuitry, such as preamplifiers, supporting the MR heads in most conventional data storage devices are designed for only one biasing mode, either current or voltage. Similarly, the sensing electronic circuitry supporting the MR heads in most conventional data storage devices is limited to only one biasing scheme. Depending on the choice in the biasing and sensing modes, four biasing and sensing schemes can be defined: (1) current biasing/current sensing, (2) current biasing/voltage sensing, (3) voltage biasing/voltage sensing, and (4) voltage biasing/current sensing. The manufacturers of the disk drive will test the head and select an optimum scheme for each drive and application. The combination of current biasing/ voltage sensing is not often used, so today disk makers select from one of three different preamplifiers biasing and sensing schemes when making a disk drive. As a consequence, each preamplifier is very specific and limited in its application, and must be intimately adjusted at the time of manufacture for the particular data storage device.

SUMMARY OF THE INVENTION

According to principles of the present invention, a single preamplifier for a data storage device can supply either a bias voltage or a bias current to the MR head. A biasing mode selector can select either the bias voltage for connection to the MR head and de-select the bias current or select the bias current for connection to the MR head and de-select the bias voltage. The selection can be performed by the maker of the disk drive at the time of assembly.

In addition, the disk drive has logic circuits including a microprocessor, a program register, a data storage register and other circuits for monitoring and storing the performance of the read head over time. A software program measures various parameters and systems operation during the life of the disk drive. If conditions warrant, the software program will automatically switch the bias from current to voltage bias or from voltage to current bias, or change the amount of bias for either the current or voltage.

A set of parameters of the MR head at $t_1$ is measured and the parameters of the MR head are measured again at $t_2$. The system then compares the measured values at $t_1$ to the measured values taken at $t_2$, and adjusts a bias current or bias voltage based on the comparison. Exemplar parameters include MR head resistance, MR head bias current, MR head bias voltage, thermal asperity, MR head open/short, excess temperature, or system bit error rate (BER).

Therefore, the useful life of the disk can be extended and the most performance possible can be obtained over the entire life of the disk drive. Further features and advantages of the invention as well as the structure and operation of various embodiments are described in detail below.

BRIEF DESCRIPTION OF THE FIGURES

The invention is best understood by reference to the figures wherein references with like reference numbers indicate identical or functionally similar heads. In addition, the left-most digits refer to the figure in which the reference first appears in the accompanying figures.

DETAILED DESCRIPTION OF THE INVENTION

Figure 1:
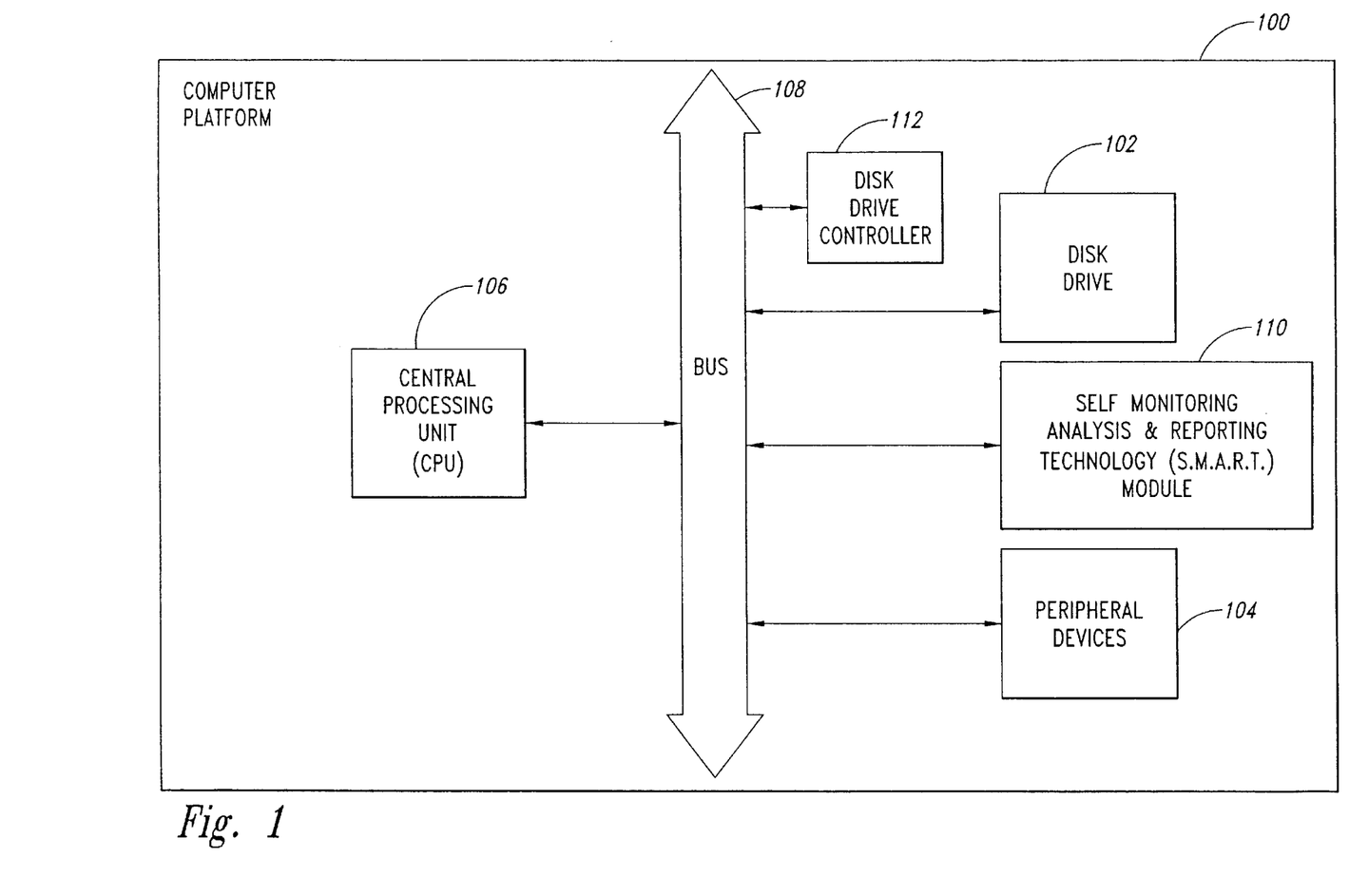
FIG. 1 illustrates a block diagram of a computer platform suitable for use with an embodiment of the invention.

FIG. 1 is a block diagram of a computer platform 100 suitable for implementing an embodiment of the invention. The computer platform 100 is any acceptable computer system, including those using Intel and Intel compatible processors, a multiple virtual storage (MVS) platform available from International Business Machines, a UNIX computing system, or any Windows® or personal computer disk operating system (PC-DOS). A variety of computing platforms may be used to implement the present invention, including other high-end (enterprise and server class) computers, desktop computers, and mobile (laptop) computers. The computing platform 100 includes at least one data storage device, shown as disk drive 102, several peripheral devices 104, such as printers, etc., at least one central processing unit 106, a bus 108, a self-monitoring analysis and reporting technology (SMART) module 110, and a disk drive controller 112. The invention applies to any data storage read device and a disk drive is shown as an example of one acceptable use of the invention.

The disk drive 102 typically is the primary data storage device used by the computing platform 100 to allow a user to record, store, and retrieve digital (or analog) data, operating systems, and other important information or files. The disk drive 102 contains electronics for exchanging data, controls, and signals with input/output (I/O) modules (peripheral devices), as well as electronics for controlling the disk read/write mechanism. Exemplar disk drives are capable of converting between the magnetic patterns on a moving disk surface and storing it as data in the disk drive's buffer. The disk drive 102 may be a single disk, multiple disks in a single drive, or several disk drives in a system. The disk drive 102 is described more fully below with reference to FIG. 2.

The peripheral devices 104 are the equipment that provides the central processing unit 106 with outside communication. The peripheral devices 104 may also be referred to as peripheral equipment.

The central processing unit 106 is that portion of the computer platform 100 that fetches and executes instructions. The central processing unit 106 may also be referred to a processor, a CPU, etc.

The bus 108 is a shared communications path consisting of one or a collection of lines. Typically the lines are shared by all components. The disk drive 102, peripheral devices 104, the SMART module 110, and the central processing unit 106 communicate with each other via the bus 108.

The SMART module 110 monitors the disk drive 102 as it is operating. It records and stores disk drive performance information. It can alert the computer platform 100 to certain performance characteristics or can warn the user of possible failures by checking key performance indicators and reporting significant changes above recommended levels. As one example, the SMART module 110 gives the user an opportunity to backup the files on the disk drive 102 if a failure is anticipated in the near future. SMART technology is well-known, and SMART modules suitable for implementing the SMART module 110 are available in the market today.

The disk drive controller 112 is a chip or circuit that controls the transfer of data between the disk drive 102 and the bus 108. The particular disk drive controller depends upon the particular disk drive used to implement the invention. Disk drive controllers are well known and disk drive controllers suitable for implementing the disk drive controller 112 are available in the market today.

Figure 2:
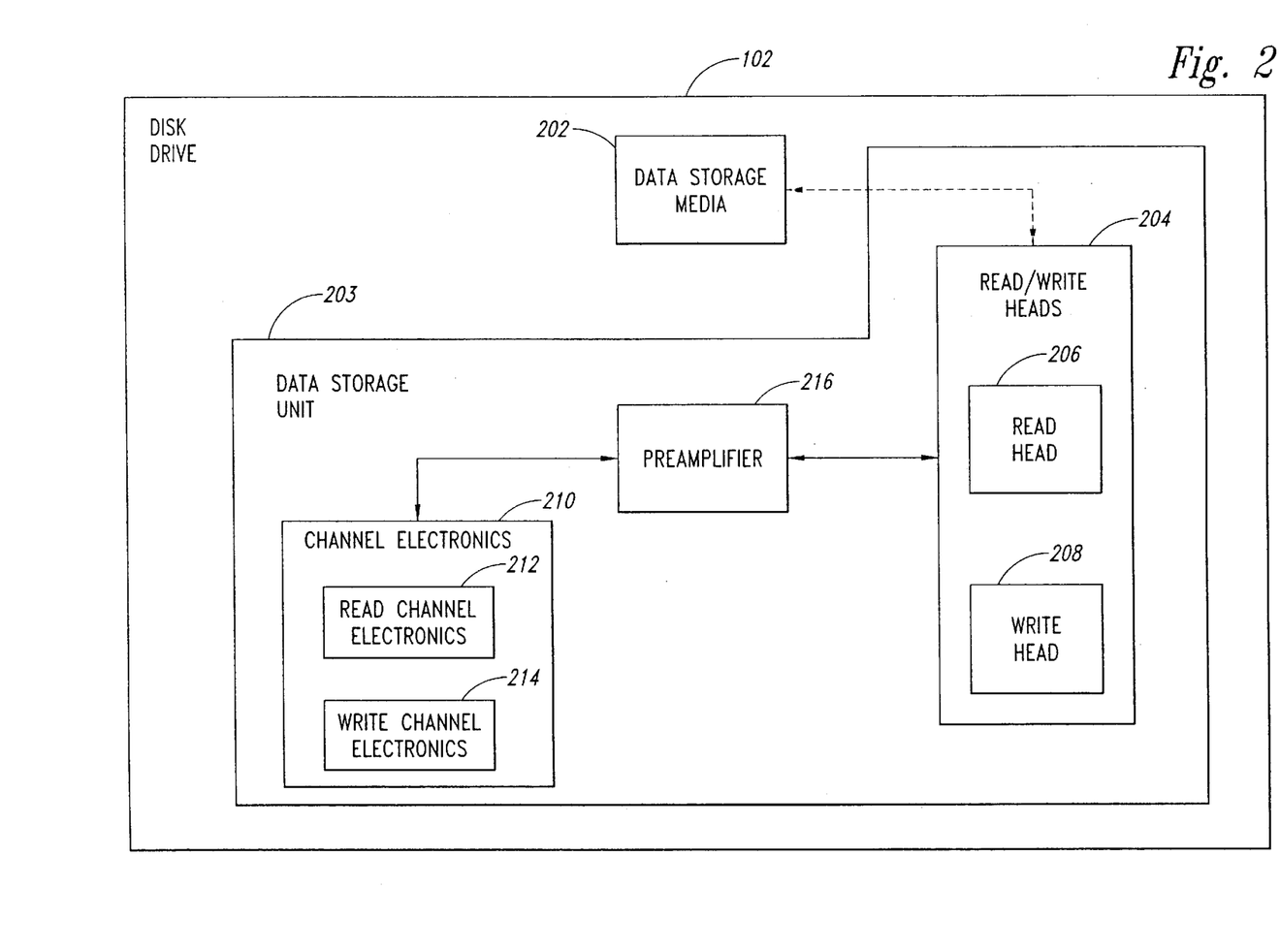
FIG. 2 is a block diagram of a disk drive exemplar.

FIG. 2 is a block diagram of an exemplar disk drive 102, which includes data storage media 202 and a data storage unit 203. Exemplar data storage media 202 include floppy disks, hard disks, write-once-read-many (WORM) disks, etc. During a typical operation, the disk drive head is stationary while the data storage media 202 rotates beneath it. The data storage media 202 may be of the type that is removable from the disk drive (removable) or of the type that is permanently mounted in the disk drive (non-removable). In the embodiment where the disk drive 102 is a hard disk drive, the data storage media 202 is a circular platter constructed of metal or plastic coated with a magnetizable material. In this embodiment, the disk drive 102 may accommodate several data storage media 204 stacked vertically (in a disk pack) within the disk drive 102.

After data are recorded on the data storage media 202, data is read from the data storage media 202 using the data storage unit 203, which includes read/write heads 204, channel electronics, 210, and a preamplifier 216. In an exemplar, the read/write heads 204 are two heads in one package, though each may have separate connections: a read head 206 and a write head 208. The write head 208 can be a single write head or multiple write heads and typically is an inductive planar coil. Write heads are well-known and need not be further described.

The read head 206 is magneto resistive, e.g., its resistance changes as a function of an applied magnetic field. In a read operation, as a read head 206 passes over the data storage media 202, it senses magnetic flux changes caused by the magenetized regions. The magnetic flux changes are then amplified and delivered to the channel electronics 210, where the data is interpreted.

Channel electronics 210 include the necessary electronic circuitry for operating the read/write heads 204 for each read or write channel in the data storage unit 203. For example, the channel electronics 210 includes read channel electronics 212 and the write channel electronics 214. The electronic circuitry for operating the read/write heads 204 are well known.

During operation the read head 206 is biased with either a DC current or DC voltage. Both the sensitivity and reliability of the read head 206 are dependent on this bias signal. A bias signal that is low in noise is desired to achieve a satisfactory signal-to-noise ratio (SNR) on the output. A higher power bias signal will usually provide a stronger head signal, but the high power will also cause the read head to age more quickly and may create other problems in the circuit. If the bias power is too low, a readable signal will not be produced. Similarly, using a bias current has advantages in some systems while using a bias voltage has advantages in other systems. Since the operating characteristics of a system change over time and aging may cause some of these changes, the bias values selected when the disk drive is manufactured may not be the optimum values some time later. It may therefore be preferred to change the bias value or from bias current to bias voltage after the system has been in operation for a period of time.

The present invention provides a system having a preamplifier that can selectively provide a bias current or a bias voltage and permits selection of the bias value for each of these over a wide range. Moreover, these values can be changed during the life of the system.

Figure 3:
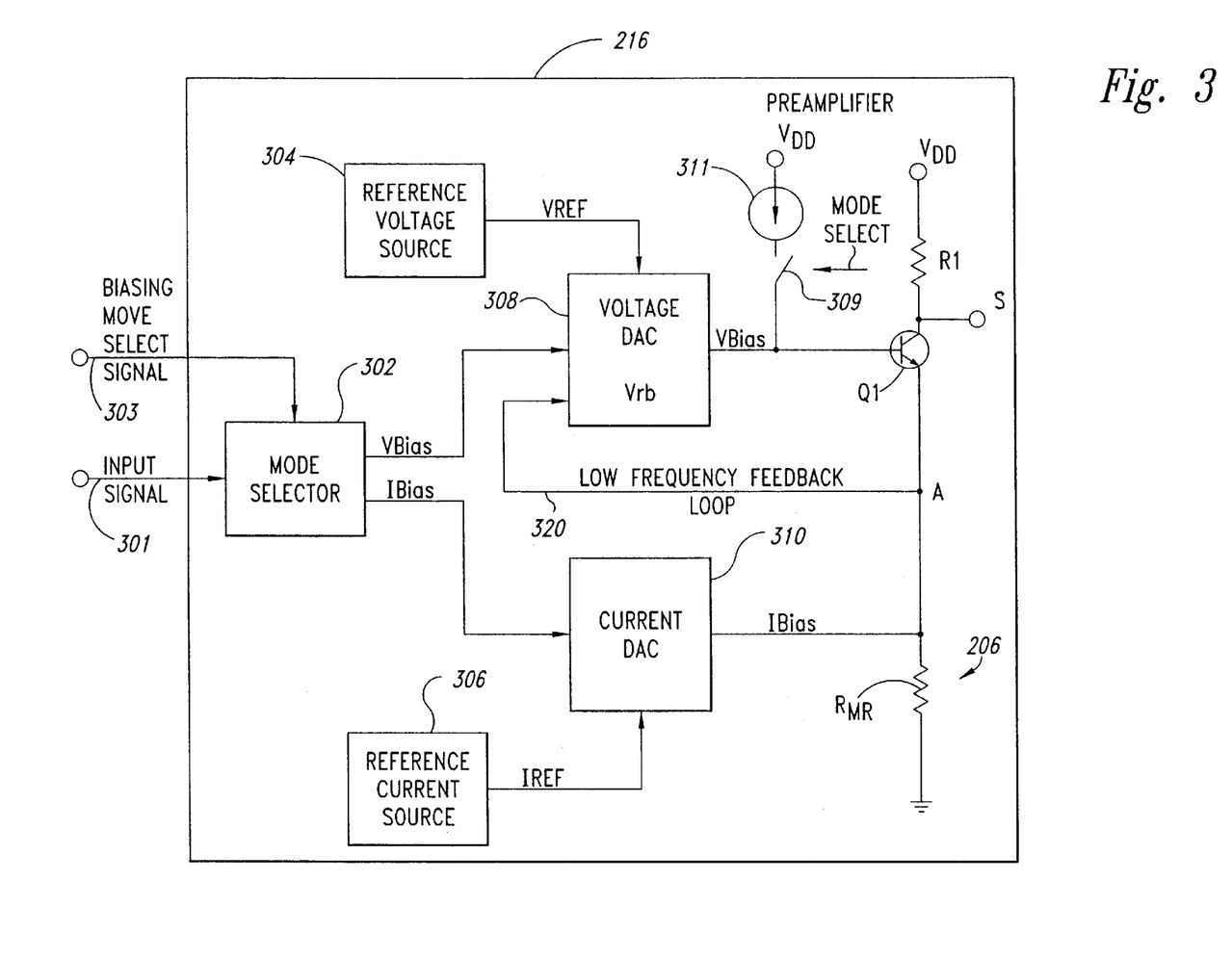
FIG. 3 is a block diagram of preamplifier exemplar.

FIG. 3 illustrates a preamplifier 216 having a mode selector 302 to select either a voltage biasing circuit or a current biasing circuit to provide the bias signal to the read/write heads 204. The voltage biasing circuit includes a reference voltage source 304, a voltage digital-to-analog-converter (DAC) 308, and a bias transistor Q1, which acts as a buffer. The resistor $R_{MR}$ represents the resistance value that the read/write heads 204 present to the transistor Q1. The voltage DAC 308 performs voltage summing, such as with a resistor string. The read/write heads 204 are connected to the emitter of the transistor Q1 and to the output of $I_{BIAS}$. A resistor $R_1$ aids in controlling the voltage across the MR head, represented by $R_{MR}$.

The current biasing circuit includes a reference current source 306 and a current digital-to-analog-converter (DAC) 310. The current DAC 308 is a current summing DAC.

When the preamplifier is in a current bias mode, the reference current source 306 provides a reference current $I_{REF}$ to the current DAC 310. The output of the current DAC 310 provides $I_{BIAS}$ directly to the head, represented as resistor $R_{MR}$ at node A. When the preamplifier is in a voltage bias mode, the reference voltage source 304 supplies $V_{REF}$ to the voltage DAC 308 and the DAC 308 provides the selected bias voltage $V_{BIAS}$ to the base of the transistor Q1 to place the correct voltage on the head at node A.

A biasing mode select signal 303 and input signal 301 are input to the mode selector 302. The mode selector 302 is a simple demultiplexer, which provides the input signal, the bias value, to either the voltage bias DAC or the current bias DAC, depending on the state of the biasing mode select signal 303. It disables the nonselected output.

When voltage bias is selected, the input signal 301 to the mode selector 302 is provided as the output on the voltage bias line $V_{BIAS}$. This provides a signal having a representation of the desired value of the bias to be used on the read head 206 as an input to the voltage DAC 308. The input signal to the voltage DAC 308 uses the reference voltage $V_{REF}$ as a power supply and stable reference value to provide the output $V_{BIAS}$. A low frequency feedback loop 320 provides the voltage on node A, back to the voltage reference bias input, $V_{rb}$, of the voltage DAC 308. A mode select switch 309 is open in the voltage bias mode so that the voltage bias signal $V_{BIAS}$ is determined by the output of the voltage DAC 308. The level of $V_{BIAS}$ provided on the output is thus directly determined by the bias value input signal 301 and feedback is provided on loop 320 to ensure the exact desired voltage across the head 206. The current DAC 310 is disabled so its output has no affect on the preamplifier 216.

The transistor Q1 also acts as a sensor of the voltage on node A, as picked up and determined on a node S, or other suitable pick-up node.

When current bias is selected, the bias value input signal 301 to the mode selector 302 is provided as an output on the current bias line, $I_{BIAS}$. This provides a signal having a representation of the desired value of the bias to be used as an input to the current DAC 310. The current DAC 310 provides the selected value as an output on $I_{BIAS}$ using the reference current as a current source. Any changes in the level of current provided on the $I_{BIAS}$ are thus determined by the value of the signal at the bias input signal 301 through the current DAC 310. The mode select switch 309 is closed to provide a preset emitter current from Q1. This maintains Q1 in the "on" state with a low current flow. The current through a current source 311 to bias Q1 "on" is at a selected suitable value to permit Q1 to function as a sensor for the voltage and/or current across the MR head. The transistor Q1 thus performs only the sensor function when the preamplifier 216 is in the current bias mode. The voltage DAC 308 is disabled so its output has no affect on the preamplifier 216.

The input signal 301 is provided from the central processor unit 106, a local processor in the channel electronics 210, external location or other source.

The transistor Q1 performs both a supply function and a sensor function in one embodiment. Of course, in an alternative design, a separate sensor circuit is used so that the transistor Q1 or its equivalent performs only a supply function and the sensor circuit performs the sensor functions separately. In such a case, the mode select switch 309 and the current supply 311 are not used because there will be no need to keep the transistor on at least at some quiescent level at all times.

The various signals including the input signal 301, $V_{BIAS}$ enable, and $I_{BIAS}$ enable are preferably provided on respective buses having from 4 to 8 bits. More or less precision or different output values can be provided as desired by varying the reference voltage and current or the number of bits on the bus.

In an alternative embodiment, the voltage DAC 308 and current DAC 310 are programmable to output select values when enabled. In this embodiment, input signal 301 is not required, but only the biasing mode select signal 303 is used. The respective DACs 308 and 310 are programmed using input pins coupled to the respective DACs and can be set to the precision desired using the correct number of program bits. The bits are software programmable so the value can be programmed as desired, either from an internal microprocessor or an external connection. The biasing mode select signal 303 will enable either the voltage DAC 308 or the current DAC 310 directly without need of a mode selector 303 and the enabled DAC will provide its programmed output bias value. Any changes in the programmable bias bits will cause a change in the output bias value as desired.

The bias value and mode can be selected a number of ways and at different times according to principles of the invention. In one embodiment, the disk maker will make the selection when assembling the disk drive. The maker will connect the preamplifier 216 to a selected read head that is installed or is to be installed in a data storage system. The maker will then run a series of tests at different bias values to determine the particular bias value which gives the target performance at a desired power level. He may also select whether to use voltage bias or current bias.

The bias value is set in the system, the disk drive is tested, and if acceptable, is provided for installation in computers. The disk drive could be tested by the computer maker, who could also make bias value and mode adjustments if they were determined necessary at this time. After the computer maker is satisfied with the performance of the disk drive, they will then complete the computer assembly and ship it to an end user.

The bias mode and bias value can stay the same for the life of the disk drive if desired. The ability to select between current bias and voltage bias and to program the bias values at the manufacturing stage provides a significant advantage over the prior art preamplifiers that provide either a current bias preamplifier or a voltage preamplifier, but not both.

According to a further embodiment, the bias mode and bias value can be changed after the head has been used by the end customer using a previously stored software analysis and program, as will now be explained. This same program could be used at the time of manufacture as well.

Figure 4A:
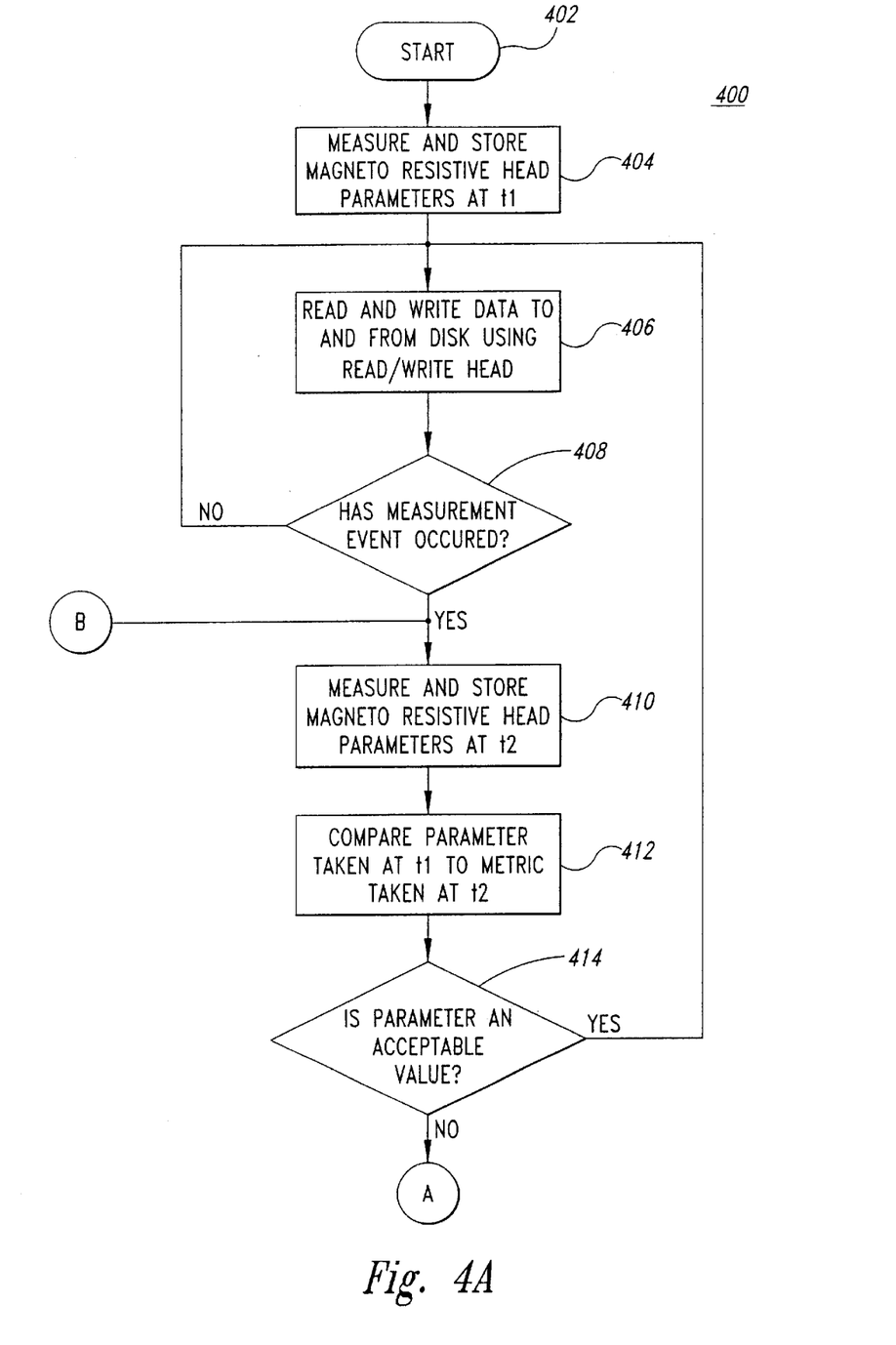
FIGS. 4A and 4B are flowcharts of a MR head biasing process performed by an example embodiment.
Figure 4B:
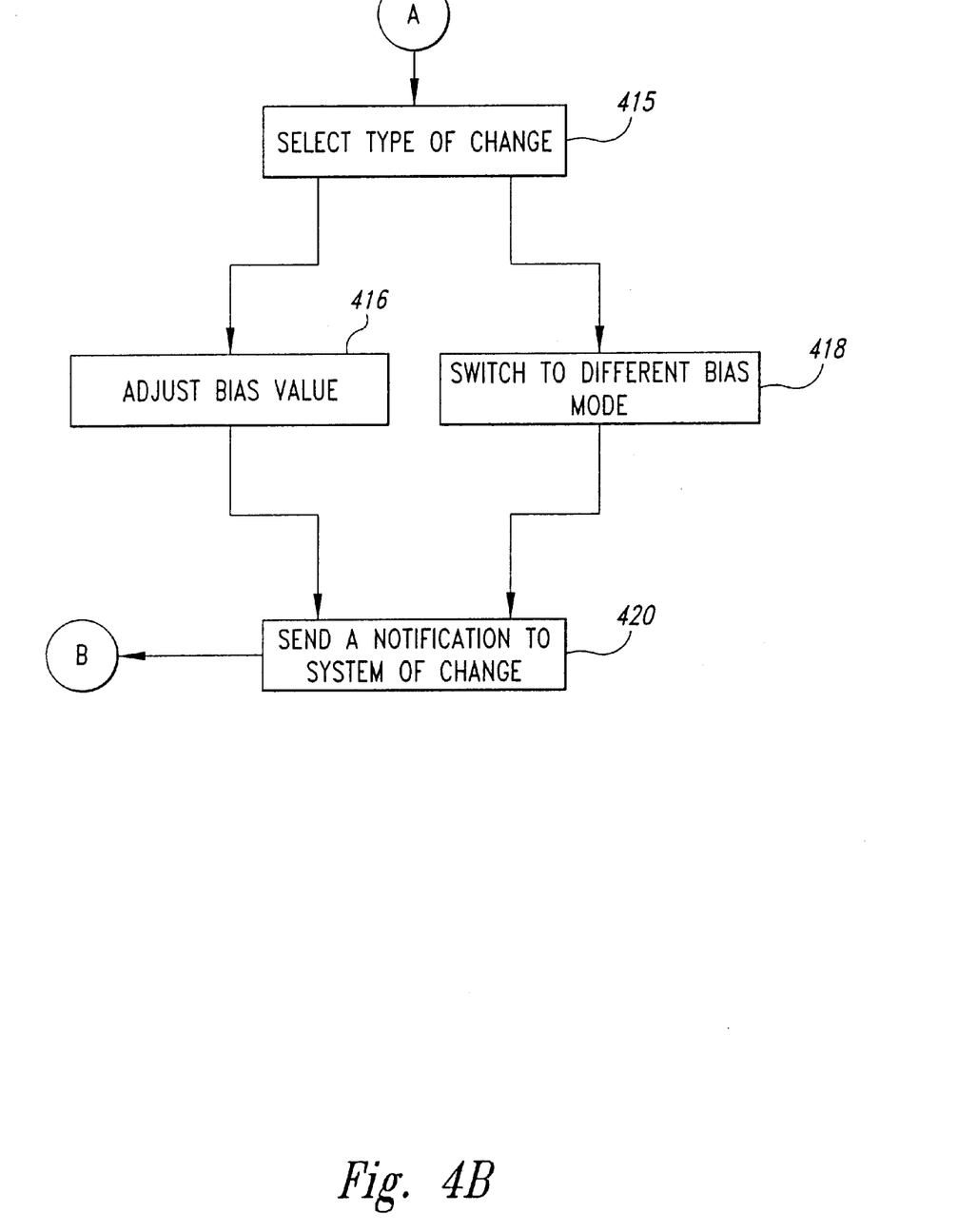

FIGS. 4A and 4B are flowcharts of a bias selection process performed by one embodiment of the invention. Operation of the process 400 begins with step 402, where control passes to step 404. In step 404, the computer platform 100 measures and stores a number of MR head parameters at $t_1$. In step 406, the computer platform 100 reads and writes data to and from the data storage media 202 using the read/write heads 204. In step 408, the computer platform 100 determines whether a new measurement should be taken or not. If a new measurement event has not occurred, the process 400 returns to step 406 and the disk drive continues in operation.

A measurement event can be selected as any convenient occurrence in a disk drive operating life. In one embodiment, the measurement event is each time the disk drive is turned on, in another, the event is each time it is turned off. Since some disk drives run many hours (or days) without ever being turned off, in some systems, the event may be after a set number of hours of operation, for example every ten hours of operation or every one hundred hours. Thus, at a preset interval the parameters of the head will be stored and measured.

Of course, some of the parameters are stored by the SMART system continuously during the disk operation. For example, the system may store such things as the bit error rate, the number of times the disk is accessed, the average access time and other operating characteristics. These are stored in the system and updated during disk drive operation. When the measurement event occurs, the software program will go and fetch this stored data from memory and perform the analysis.

If a measurement event has occurred, the process 400 passes to step 410, where the computer platform 100 measures and stores a number of MR head parameters or obtains them from memory at $t_2$.

In step 412, computer platform 100 then compares the parameters measured at $t_1$ to the parameters taken at $t_2$. In step 414, the computer platform 100 determines whether a key parameter or combination of parameters have changed to an unacceptable value. If a parameter remains at an acceptable value, the process 400 returns to step 406 and disk drive operation continues. If a parameter has changed to an unacceptable value, the process 400 proceeds to step 415 to select the type of change to be performed.

Depending on the type of error located and the parameter to be compensated for, the system will select to try a bias value change first or may try to change to a different bias mode. The system performs either step 416 or step 418 as appropriate to compensate for the unacceptable parameter. For example, if the computer platform is set to current bias mode, the computer platform 100 can adjust the bias current amplitude, as indicated by step 416 or switch to a voltage bias mode, as indicated by step 418. Alternatively, if the computer platform 100 is set to the voltage bias mode, the computer platform 100 can switch to the current bias mode or adjust the bias voltage to compensate for the unacceptable parameter. The parameters tested and stored may include such things as MR head resistance, MR head bias voltage, MR head current density, thermal asperity, MR head open/short, excess temperature, or system bit error rate (BER).

After the bias current or voltage has been adjusted, or the biasing mode has been switched, step 420 sends a notification to the computer platform 100 of the adjustment or switch. The program then returns to step 410 to measure and store values to confirm that disk drive operation is now in an acceptable range. Or, it can return to the start and wait for the next measurement event.

Two examples will be given of possible changes and notification. If the bit error rate is too high, it may be desired to increase the bias value. While increasing the bias value will likely improve the bit error rate, it may cause rapid aging of the system, and in particular, the head itself. Notification is sent to the user, either to permit the user to make a final decision or to inform the user that the computer has made a decision and provide an estimate to the user of the remaining expected life in the disk and suggest a backup be performed.

On the other hand, if the parameter is head resistance and head resistance is too high, it may be desired to reduce the bias value or change from current mode to voltage mode. The change may result in an increase in the access time (due to multiple reads being required), or an increase in the bit error rate, but overall systems life will be extended. The user may be notified to make a final selection or, the computer may automatically select the change to be made and may notify the user or else store the change in a register.

In one embodiment, the system will make the change and then perform subsequent tests to ensure that the parameter is now in an acceptable range. It will then test other parameters as well and make sure the whole system is in proper operation after the change is made. If all parameters are now within the proper range and the disk drive operates properly with the change, it is made permanent and the system is returned to standard operation, step 406. Of course, if the change does not result in the parameter being within the range or the overall system does not operate properly, further changes are made, either in bias value or mode and the process continues until acceptable operation is obtained. This, of course, is one of the advanced embodiments and is not implemented in some systems which take advantage of the invention.

Figure 5:
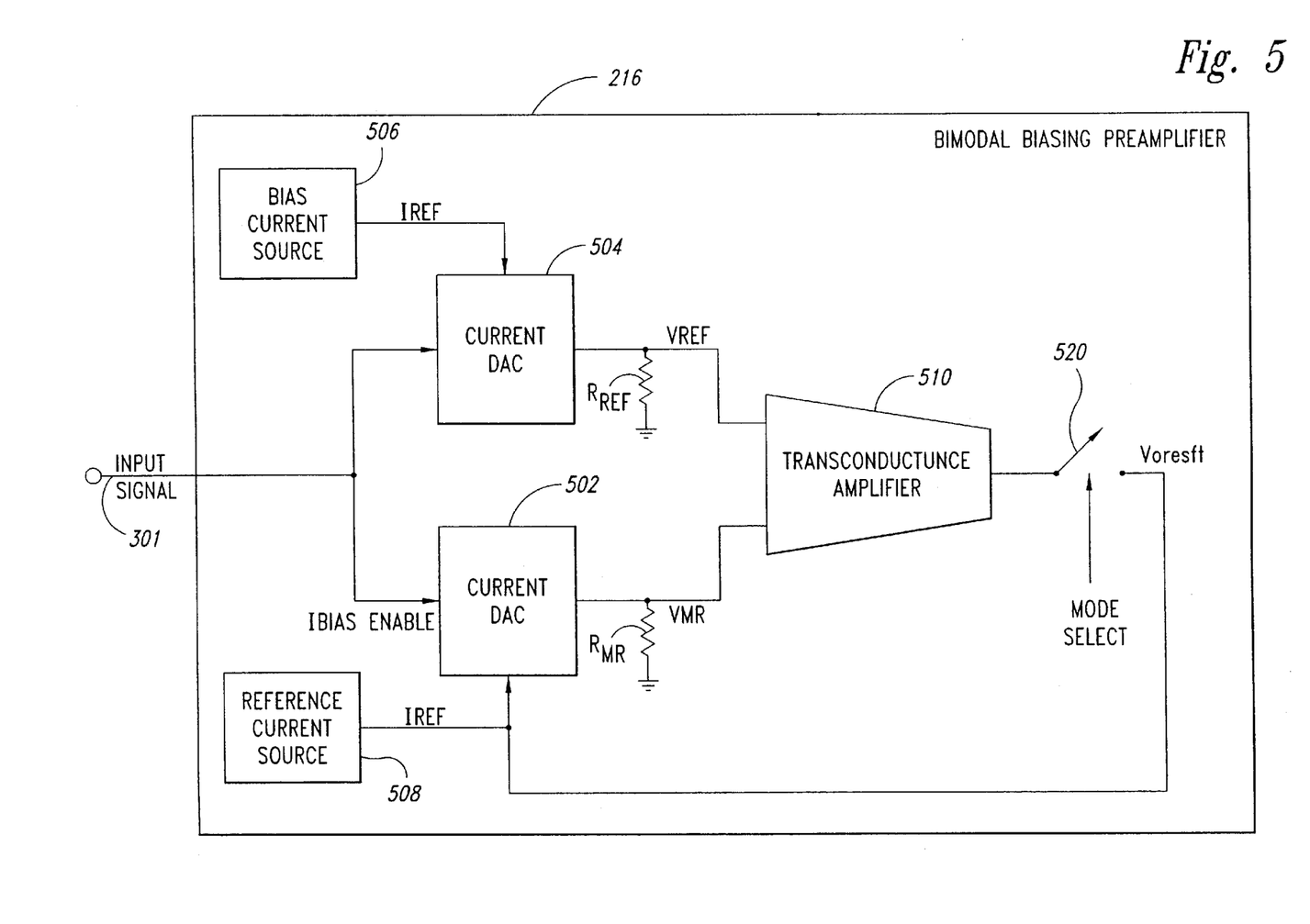
FIG. 5 is a block diagram of another preamplifier exemplar.

FIG. 5 is a block diagram of another embodiment of the biasing circuit preamplifier 216. According to this exemplar, two current DACs are used but additional circuitry is connected so that either a bias current or the equivalent of a bias voltage is provided.

In the current bias mode, a current biasing scheme is used which includes current DAC 502. The current bias circuit works in a manner previously described with respect to FIG. 3.

When the preamplifier is in a voltage bias mode, the switch 520 is closed. The input signal is provided to the current DAC 502 control bus and to current DAC 504 control bus, respectively. A bias current source 506 and the current DAC 504 act as a separate programmable current source, which supplies current to a reference resistor $R_{REF}$. A reference current source 508 feeds a reference current $I_{REF}$ to the current DAC 502. The output of the current DAC 504 supplies a reference voltage $V_{REF}$ to the input of a transconductance amplifier 510, which has the voltage across the head, $U_{MR}$ as its other input. This will force the voltage across the MR head $V_{MR}$ to be equal to the reference voltage $V_{REF}$ as will be explained.

The preamplifier 216 applies the same code (software or hardware instruction) to both the current DAC 504 and the current DAC 502. The output of the a transconductance amplifier 510 is fed to the reference input of the current DAC 502, which causes the reference point of the current DAC 502 to vary. This will cause a change in the output value of current DAC 502 to drive $U_{MR}$ to equal $V_{REF}$. Any difference between them creates an offset value that is feedback from the amplifier 510 to the input of the current DAC 502. This difference can be kept as low as a few millivolts, and is equivalent to about one or two percent, depending on the ohmic value of the MR head.

The switch 520 controls the bias mode. The switch 520 is open for the current bias mode and closed for the voltage bias mode. Closing switch 520 creates the feedback loop so that the $V_{REF}$ output of DAC 504 is provided as a comparison to the voltage on the head, $V_{MR}$. Having switch 520 open removes any affect of current DAC 504 and the head is in the current bias mode. Switch 520 can be any acceptable switch, such as a MOS transistor, bipolar or other acceptable switch that can be easily opened or closed under microprocessor control.

The preamplifier 216 may be implemented using hardware, software, or a combination of hardware and software, and may be implemented in a computer system or other processing system. In an embodiment where the invention is implemented using a combination of hardware and software, the invention may be implemented using an application-specific integrated circuit (ASIC). Of course, the preamplifier can include other circuits as part of its overall operations and only those related to the operation of the invention are shown herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for biasing a read head for use with a data storage system, comprising:

measuring a set of parameters of the read head at $t_1$;

storing the values measured at $t_1$ in a parameter history file;

measuring the set of parameters of the read head at $t_2$;

comparing the parameter values measured at $t_1$ to the values taken at $t_2$;

selecting a bias mode for the read head from one of a bias current and a bias voltage and deselecting the non-selected bias mode; and adjusting the selected bias mode to the read head based on the comparison between the parameters measured at $t_1$ to the parameters measured at $t_2$.

2. The method of claim 1, further comprising:

measuring one of the bias current, the bias voltage, or a bit error rate (BER) of a system using the head at $t_0$; and measuring one of the bias current, the bias voltage, or the bit error rate (BER) of a system using the head at $t_1$.

3. The method of claim 1, further comprising backing up data contained on the data storage device when a bit error rate is above a threshold level.

4. The method of claim 1 wherein the set of parameters comprises at least one of the magneto resistive head resistance, magneto resistive head bias current, magneto resistive head bias voltage, thermal asperity, magneto resistive head open/short, excess temperature, or system bit error rate (BER).

5. A method for controlling the biasing mode for a magneto resistive head in a disk drive system, comprising:

determining a first biasing mode for the magneto resistive head;

measuring a parameter of the magneto resistive head at $t_1$ of disk drive operation;

measuring a parameter of the magneto resistive head at $t_2$ of disk drive operation;

correlating the parameter measured at $t_1$ to the parameter taken at $t_2$; and implementing a second biasing mode for the magneto resistive head based on the correlation between the metric measured at $t_1$ to the metric measured at $t_2$.

6. A method for controlling the biasing mode of a magneto resistive head in a disk drive system, comprising:

determining a first biasing mode for the magneto resistive head;

measuring a parameter of the magneto resistive head at $t_1$ of disk drive operation;

measuring a parameter of the magneto resistive head at $t_2$ of disk drive operation;

correlating the parameter measured at $t_1$ to the parameter taken at $t_2$; and implementing a second biasing mode for the magneto resistive head based on the correlation between the metric measured at $t_1$ to the metric taken at $t_2$, wherein the parameter comprises one of the magneto resistive head resistance, magneto resistive head bias current, magneto resistive bias voltage, thermal asperity, magneto resistive head open/short, excess temperature, and system bit error rate (BER).

7. The method of claim 6, wherein the first biasing mode comprises one of a bias current and a bias voltage, and the second biasing mode comprises the other of the bias current and the bias voltage.

* * * * *